| United States Patent [19] | [11] | 4,038,365 |
|---|---|---|
| Patil et al. | [45] | July 26, 1977 |

[54] REMOVAL OF LOW LEVEL HARDNESS IMPURITIES FROM BRINE FEED TO CHLORINE CELLS

[75] Inventors: Arvind S. Patil, Grosse Ile; Shyam D. Argade, Woodhaven; Stephen M. Collins, Riverview, all of Mich.

[73] Assignee: BASF Wyandotte Corporation, Wyandotte, Mich.

[21] Appl. No.: 637,328

[22] Filed: Dec. 3, 1975

[51] Int. Cl.$^2$ .......................... C01F 11/18; C01F 5/22; C25B 1/16
[52] U.S. Cl. ................................. 423/161; 423/164; 423/165; 204/98; 204/128; 210/75
[58] Field of Search .................... 204/98, 128; 210/75; 423/164–165, 161

[56] References Cited

U.S. PATENT DOCUMENTS

| 2,479,138 | 8/1949 | Scoles | 423/164 |
|---|---|---|---|
| 2,892,683 | 6/1959 | Veronica | 423/164 |
| 3,051,637 | 8/1962 | Judice et al. | 204/98 |
| 3,128,248 | 4/1964 | Suzuki | 423/165 |
| 3,618,766 | 11/1971 | Morey | 210/75 |

OTHER PUBLICATIONS

"Chemical Manipulation" by Michael Faraday, 1829, p. 228.

*Primary Examiner*—R. L. Andrews
*Attorney, Agent, or Firm*—Bernhard R. Swick; Arnold S. Weintraub; Robert E. Dunn

[57] ABSTRACT

Brine from a conventional treatment process is pre-filtered prior to the electrolysis of same by a method which includes the steps of: (a) heating the brine, (b) adding sodium carbonate thereto, (c) stirring the solution, (d) allowing the solution to settle, and (e) passing the solution through an absolute membrane filter. The filter "polishes" the brine feed by removing the high hardness ions.

9 Claims, No Drawings

REMOVAL OF LOW LEVEL HARDNESS IMPURITIES FROM BRINE FEED TO CHLORINE CELLS

BACKGROUND OF THE INVENTION

1. Field of the Invention:

The present invention pertains to brine feeds for use in chlor-alkali cells. More particularly, the present invention pertains to the treatment of brine prior to the electrolytic decomposition thereof. Even more particularly, the present invention pertains to the further treatment of a conventionally treated brine feed prior to the electrolytic decomposition thereof.

2. Prior Art:

As is known to those skilled in the art to which the invention pertains, a sodium chloride brine of relatively high purity is required to operate an electrolytic diaphragm cell for the production of chlorine and sodium hydroxide therefrom. This is because the hardness ions in the brine, e.g. calcium, magnesium and strontium ions, tend to precipitate out of the brine as hydroxides or carbonates during electrolysis. These precipitates form in the diaphragm thereby plugging same. Plugging of the diaphragm reduces cell efficiency and neccessitates the shutting of the cell to either renew or replace the diaphragm.

The prior art has appreciated this problem and has sought to alleviate it. For example, in U.S. Pat. Nos. 1,259,683 and 1,308,509 there is taught the addition of sodium chloride to the brine to maintain a high concentration of sodium chloride therewithin in comparison to the hardness ions. Other art teaches the operation of a chlor-alkali cell at currents below the necessary to decompose the calcium salts present in the brine. Still other pertinent prior art is found in U.S. Pat. No. 1,386,244 which teaches a pre-treatment of the feed by adding thereto alkali materials which react with the hardness ions to form precipitates which are then separated out from the brine. The reference specifically teaches the stage-wise precipitation of the hardness ions by the addition of caustic soda to the feed, coupled with the filtration of the solution to provide a purified brine. Because of the cost associated with these prior art processes they are, generally, not commercially employed.

Conventionally, today, the brine is treated by the addition thereto of sodium carbonate and sodium hydroxide to precipitate, simultaneously, magnesium hydroxide and calcium carbonate. The so-treated brine is, then, clarified and filtered. Generally, by so-treating the brine the total hardness ion level (based on calcium) is reduced to about ten parts per million, by weight, based on the weight of the brine. Also, the brine is at a pH level of about eight to ten. However, even this treatment of the brine does not provide sufficient reduction in the hardness ion content to avoid the problems of rapid plugging of the diaphragm.

The present invention, on the other hand, reduces the hardness ion level in the brine while being economically feasible and acceptable.

SUMMARY OF THE INVENTION

In accordance with the present invention, the brine feed from a conventional treatment system is polished to further reduce the hardness ion level therewithin.

The polishing process hereof comprises adding to the brine from about 150 to about 1500 parts per million, by weight, based on the weight of the brine, of sodium carbonate. The brine is, generally, at a temperature of from about 60° F. to about 80° F. The solution is then mixed thoroughly. Thereafter, the solution is allowed to settle for about two to ten hours. After standing, the brine is then filtered through at least one pressure filter, which polishes the brine by removing the salts of the hard ion therefrom. The so-treated brine is then ready for use in a chlor-alkali cell.

Optionally, contemporaneous with the sodium carbonate addition, a small amount of sodium hydroxide and/or a flocculating agent can be added to the brine. Also, after filtration the pH of the brine can be adjusted by the addition thereto of controlled amounts of hydrochloric acid. Furthermore, the pH of the brine can be adjusted by adding sodium hydroxide thereto prior to the instant treatment. For a more comprehensive discussion of the present invention, reference is made to the following detailed description thereof.

DESCRIPTION OF THE PREFERRED EMBODIMENTS

As noted hereinbefore, conventionally teated brine has the hardness ion level thereof further reduced by a polishing process which comprises.

a. adjusting the temperature of the brine to from about 60° F. to about 80° F., b. adding sodium carbonate to the brine, c. stirring the brine, d. allowing the brine to stand to settle the solution, and, thereafter e. filtering the brine through at least one filter. Optionally, sodium hydroxide and/or a flocculating agent can be added to the brine contemporaneous with the addition of the sodium carbonate. Also, the pH of the brine can be adjusted after the filtration thereof by the controlled addition of hydrochloric acid thereto. Moreover, the pH of the brine can be adjusted before the instant treatment by the addition of sodium hydroxide thereto. At the outset it should be noted that the present process is applicable to treated brine for use in electrolytic cells for the production of chlorine and sodium hydroxide therefrom. As noted hereinbefore, the brine is conventionally treated prior to its introduction into the cell, by the addition thereto of sodium carbonate and sodium hydroxide. This addition precipitates out calcium carbonate and magnesium hydroxide. The brine is, then, clarified and filtered. Prior to the present invention the so-treated brine was then fed to the electrolytic cell. It should be noted, also, that conventionally treated brine generally contains about ten parts per million (ppm) of hardness ion (expressed as calcium), by weight, based on one million parts by weight of brine. It is this conventionally treated brine which is further treated in accordance with the present process.

Depending upon the temperature of the brine to be treated in accordance herewith, initially, the temperature thereof is adjusted to a temperature of from about 60° F to about 80° F. The heating of the brine is important when it has been stored in a cold climate or environment. By the initial temperature adjustment, when used, the rate at which the remaining steps of the process proceed is facilitated.

After adjusting the temperature, the conventionally treated brine has added thereto from about 150 to about 1500 ppm, by weight, based on the weight of the brine, of sodium carbonate. The sodium carbonate is added in any convenient form and usually as a powder or slurry thereof. Preferably, from about 500 to 1000 ppm of sodium carbonate is added to the brine. This addition of sodium carbonate causes the further precipitation of calcium ion, as calcium carbonate, from the brine. The sodium carbonate is added to the brine by any conventional technique, such as manual addition or the like. At the elevated temperature, the interchange between the sodium ion and the calcium ion is accelerated.

As the sodium carbonate is added to the brine, the entire mixture is stirred. Optionally, contemporaneous with the sodium carbonate addition, minor amounts of sodium hydroxide and/or a flocculating agent can be added to the brine to precipitate out magnesium hydroxide. The sodium hydroxide can, also, be added prior to or immediately after the sodium carbonate addition. Preferably the sodium hydroxide is added either prior to or contemporaneous with the sodium carbonate. The sodium hydroxide serves two functions. Initially, the sodium hydroxide raises the pH of the brine to any desired level. Secondly, the sodium hydroxide facilitates the precipitation of magnesium ions as magnesium hydroxide. When used, the sodium hydroxide is added in sufficient amounts to raise the pH of the brine to about 12.

The flocculating agent enhances the growth and settling of calcium and magnesium containing precipitates. The flocculating agent can be either organic or inorganic.

Useful inorganic flocculating agents include, for example, hexametaphosphates and tripolyphosphates. Useful organic flocculating agents are polyacrylic compounds having a molecular weight ranging from about 150,000 to about 500,000. Representative of such compounds are, for example, polyacrylic acid, polyacrylates, polyacrylamides, polymethacrylic acid, polyaminoacrylate and the like, as well as mixtures thereof. The flocculating agent is employed, where used, in an amount ranging from about 5 to 50 ppm. Preferably, the flocculating agent is employed in an amount ranging from about 10 to 25 ppm, based on a million parts by weight of brine. It should be noted that with respect to the amounts employed that it is a function of the molecular weight of the flocculant. The higher the molecular weight the lower the amount of flocculant necessary. Thus, the range defined herein accommodates the range in molecular weights.

It should, also, be noted that by utilizing the flocculant, besides precipitating out ions, other advantages accrue to the instant invention. First, the necessary settling time is reduced. Secondly, the filtration through the pressure filter is improved. In this regard filters having a larger pore size can be utilized.

The sodium hydroxide and flocculating agent are added to the brine by any conventional mode.

After the sodium carbonate addition, with or without the optional additives, the resulting solution, after being stirred, is then allowed to settle. The settling period usually lasts for a period of from about two to ten hours and, preferably, from about six to eight hours, where the flocculant is not employed. This period of time permits all of the hardness ions to react with the sodium carbonate and hydroxide or to agglomerate the tiny precipitates with the flocculant. It should be noted in this regard that the elevated temperature of the brine increases the reaction rates occurring in the brine.

After settling, the brine is then polished. This is achieved by pumping the brine through a pressure filter or a series of pressure filters, at least the last of which must be a filter formed from a filter material having a pore size of less than five microns. The filtering captures the precipitates or hardness ion salts and prevents their passage into the electrolysis cell.

The filter or filters employed herein are pressure filters which can have any desired configuration, such as cylindrical filters, plate filters, filter presses and the like. In practicing the present invention it is preferred that a series of filters be utilized, wherein at least the last filter has a pore size of from about one to two microns. Any suitable pressure filter material meeting this criterion can be used herein. Particularly preferred materials are halogenated hydrocarbon filter materials such as polyvinylchloride membranes, polytetrafluoroethylene, perfluorinated sulfonic acid-tetrafluoroethylene copolymers and the like.

As noted, the brine is pumped through the filters to separate out of the brine the salts of the hardness ions which are formed by the addition of the sodium carbonate.

The polished brine provided hereby generally has a hardness ion level of less than two ppm (expressed as calcium). By so-reducing the hardness ion level there is provided improved chlorine-caustic cell operation by reduction in diaphragm plugging rates. By reducing the plugging rate, the diaphragm life is prolonged. Furthermore, lower cell voltages are required thereby reducing power costs. Also, there is a lower sodium chlorate level in the caustic. Thus, the benefits accruing to the present invention are many-fold.

As noted hereinbefore, after the brine is polished the pH of the brine can be adjusted to about 8 to 12, if necessary. This is achieved by the addition of controlled amounts of hydrochloric acid thereto. The addition can be conducted by any suitable mode, including manual addition and the like.

For a more complete understanding of the present invention, reference is made to the following examples, which are to be construed as illustrative, rather than limitative of the invention.

EXAMPLE I

A sample of conventionally treated brine having a pH of 9 and a hardness level of approximately ten ppm expressed as calcium was maintained at a temperature of about 75° F. To this brine was added, manually, one thousand ppm of sodium carbonate, as soda ash. The resulting solution was then stirred. After stirring the solution was allowed to stand for eight hours. Therefter, the solution was passed through a pressure filter. The filter was formed from a porous highly expanded polytetrafluoroethylene sold commercially under the name GORE-TEX. The filter had a nominal pore size of about one to two microns. After filtration the brine was tested for hardness by EDTA (ethylene diamine tetraacetic acid) titration. The so-treated brine exhibited a total hardness level of 1.5 ppm, expressed as calcium.

EXAMPLE II

Utilizing a brine sample similar to that employed in Example I and at a temperature of about 75° F, a polishing treatment was carried out. However, prior to adding the sodium carbonate, sufficient amounts of sodium hydroxide were added thereto to raise the pH of the brine to about 12. After the sodium hydroxide addition, the polishing was carried out in the manner described in Example I. The brine, after filtering, evidenced a hardness, based on calcium, of 0.5 ppm and had a magnesium level of about 0.5 ppm.

EXAMPLE III

Utilizing a brine sample similar to that employed in Example I a polishing treatment was conducted in accordance with the present invention. The procedure employed was the same as in Example I. However, contemporaneous with the addition of the sodium carbonate there was added to the brine 10 ppm of an about 500,000 molecular weight polymethacrylic acid. The resulting solution was then stirred and allowed to settle for about 1.5 hours. After filtering the brine sample was then tested for hardness levels using an EDTA titration. The so-treated brine had a hardness level of 0.5 ppm, based on calcium.

Having, thus, described the invention, what is claimed is:

1. A process for the subsequent treatment of conventionally treated brine prior to the electrolysis of the brine, comprising:
    a. adjusting the temperature of the conventional brine to a temperature of from about 60° F to about 80° F, the brine having a hardness ion level of about ten parts per million, by weight, based on the weight of the brine, the hardness ion level being based on calcium, the brine having a pH of from about eight to ten,
    b. adding sodium carbonate to the brine,
    c. stirring the solution,
    d. allowing the solution to stand,
    e. passing the solution through at least one filter having a nominal pore size of less than five microns, and
    f. adjusting the level of the pH of the brine, after filtering, to a level above that of the conventional treated brine,
    whereby the ion hardness level of the brine is reduced to less than two parts per million, expressed as calcium, prior to electrolysis of the brine.

2. The process of claim 1 wherein:
a flocculating agent is added to the brine with the sodium carbonate.

3. The process of claim 2 wherein the flocculating agent is selected from the group consisting of polyphosphates, polyacrylates, polyacrylic acid, polycrylamides, polyaminoacrylates and mixtures thereof.

4. The process of claim 1 wherein:
sodium hydroxide is added to the brine either prior to, with, or after the sodium carbonate addition.

5. The process of claim 1 wherein the sodium carbonate is employed in an amount ranging from one hundred and fifty to about fifteen hundred parts per million thereof, by weight, per one million parts by weight of brine.

6. The process of claim 1 wherein the solution is allowed to stand for a period of from about two hours to about ten hours.

7. The process of claim 1 wherein the solution is passed through a series of filters, at least the last one of which has a pore size of from about one to two microns.

8. The process of claim 1 wherein the filter is formed from a material selected from the group consisting of polytetrafluoroethylene, perfluorinated sulfonic acid-tetrafluoroethylene copolymers, polyvinylchloride and mixtures thereof.

9. The process of claim 1 wherein:
the adjusting of the pH of the brine after filtering, is achieved by the addition of hydrochloric acid thereto.

* * * * *

UNITED STATES PATENT AND TRADEMARK OFFICE
CERTIFICATE OF CORRECTION

PATENT NO. : 4,038,365
DATED : July 26, 1977
INVENTOR(S) : Arvind S. Patil, Shyam D. Argade and Stephen M. Collins It is certified that error appears in the above-identified patent and that said Letters Patent are hereby corrected as shown below:

Column 2, line 22, the word "teated" should read ---treated---.

Column 2, lines 31 and 32, with the word "Optionally," a new paragraph should begin.

Column 3, line 67, the word polished should be in quotation marks as follows: ---"polished"---.

Column 4, line 22, the word polished should be in quotation marks as follows: ---"polished"---.

Column 4, lines 50 and 51, the word "therefter" should read ---thereafter---.

Column 6, claim 3, line 12, the word "polycrylamides" should read ---polyacrylamides---.

Signed and Sealed this

Twenty-fifth Day of October 1977

[SEAL]

Attest:

RUTH C. MASON
Attesting Officer

LUTRELLE F. PARKER
Acting Commissioner of Patents and Trademarks